3,832,130
METHOD AND COMPOSITION FOR PREVENTING DETERIORATION OF HIDES FROM FRESHLY SLAUGHTERED ANIMALS

Elmer A. Weaver, Spring Mount, William J. Hopkins, Philadelphia, and Alfred H. Korn, Maple Glen, Pa., assignors to the United States of America as represented by the Secretary of Agriculture
No Drawing. Filed July 28, 1972, Ser. No. 275,988
Int. Cl. C14c 1/00
U.S. Cl. 8—94.18                9 Claims

ABSTRACT OF THE DISCLOSURE

Hides from freshly slaughtered animals are preserved and prevented from deteriorating by treatment with a synergistic mixture of water, acetic or propionic acid, and N,N'-bis(methoxy)methyl uron. Sodium acid sulfate is also used in place of the acetic or propionic acid. A surfactant is usually added to the mixture for wetting or emulsifying purposes. However, it is not an essential element for the synergistic action. The amount of water can be varied greatly, from 10 to 100%, based on the weight of the hide, without affecting the efficacy of the treatment. Excellent results are obtained with a mixture containing 10% water, 0.03% surfactant, 1.0% acid and 0.2% uron derivatives, all amounts based on the weight of the hide.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to the prevention of deterioration of hides from freshly slaughtered animals and more specifically to preventing such deterioration by treating the hides with a synergistic mixture of water, acetic or propionic acid, and N,N'-bis(methoxy)methyl uron.

It is well known in the art that freshly removed animal hides deteriorate rapidly because of enzyme and microbial action. The nature of the acquisition of hides contributes greatly to the factors causing the deterioration. For example, the enzymes and microbial cells present in the hide and in the blood and those that arise from the contaminating debris and manure particles in the hide and the hair are contributing factors. The grain layer, which is the most highly prized part of the hide for leather-making purposes, is usually the first part of the hide to be attacked. Consequently, a method of preventing deterioration and subsequent damage to the hide and especially to the grain layer is an important contribution to leather technology and manufacture.

The safety factor and exposure to infection of workers handling the hides is an important consideration in processing of hides. A high concentration of microbial cells not only destroys the hides but, to the people handling the hides, it can be a source of severe skin irritation and infection.

Consequently, it is an object of this invention to provide a process for preventing deterioration of the hides of freshly slaughtered animals.

Another object is to improve hide quality by preventing damage to the freshly removed skins.

A still further object is to provide a process for handling hides from freshly slaughtered animals that greatly lowers the concentration of microbial cells and thus provides safer conditions for workers handling the hides.

Still another object is to provide a process for treating hides from freshly slaughtered animals that will prevent deterioration of the hides for extended periods of time. This feature provides many advantages for the tannery operator. He can collect hides and transport them safely over greater distances than is possible at present. He can also hold hides in storage when the processing capacity of his plant is taxed to the limit or when plant equipment is inoperative or when operations are halted for other reasons.

Another further object of this invention is to provide a process of treating hides from freshly slaughtered animals that will especially protect the grain layer from damage so that it can be made into high quality leather.

According to this invention, the above objects are accomplished by a process in which hides from freshly slaughtered animals are treated with a synergistic mixture of water, acetic or propionic acid, and N,N'-bis(methoxy)methyl uron. Sodium acid sulfate may also be used in place of the acetic or propionic acid and a surfactant may be added. In relation to the hide weight, the amounts of materials needed to accomplish the desired purposes are not very large. Excellent results are obtained with as little as 0.2% of the uron derivative based on the weight of the hide. The usual amounts of the other materials is about 10% water, 0.03% surface active agent, and 1.0% acid, all based on the weight of the hide.

None of the ingredients are effective for the purposes of this invention when used individually. In fact, combinations of the individual ingredients with water and combinations of the water, surface active agent and acid are equally ineffective. Only when the uron derivative is added to the water, and acid or sodium acid sulfate, does the mixture fulfill the objectives of this invention.

For the purposes of this invention one hundred gram pieces of steerhide obtained fresh from a slaughterhouse were used. The pieces were as uniform as possible with regard to the thickness and physical condition. The samples were laden with considerable animal debris such as blood, manure, ground soil, flesh tissues, fat tissues, dust and dirt and other slaughterhouse debris.

The treating ingredients were mixed before addition of the samples and then the samples and treating mixture were agitated for at least 15 minutes in a sealed wide mouth quart jar on a rotary shaker set to shake at 200 r.p.m. The samples were then stored at room temperature and examined at different time intervals. The odor of the sample was an indication of the effectiveness of the treatment. A foul and putrid odor was considered bad as a matter of evaluation. Physical condition was also noted and evaluated as good or bad. Significant changes in the physical condition of the hide such as swelling, structure collapse, hide disintegration, gas formation, dislodged hair and/or extensive bacterial or mold growth or discoloration was considered to be a bad condition.

The number of microbial cells on the hides was determined by counting the number of cell colonies growing on plate count agar from a number of serial dilutions. To the 100 gram sample of hide in the quart jar was added 500 mls. of sterile water. The sealed jar was agitated for ten minutes on a rotary shaker and then the liquid decanted into a sterile two quart jar. Another 500 mls. of sterile water was added to the sample and the cycle repeated. Serial dilutions for the plate counts were made from the two quart jar. The plates were incubated at room temperature for a period of three to five days. The initial, untreated hide was noted to have about thirty million bacteria per gram of hide.

The liming test was made on the samples after storage in order to determine resistance of the hide substance to disintegration and loss of grain and tensile strength under conditions of the high pH of the lime. The lime test was conducted by exposing the samples for 4 days to the following mixture based on the hide weight: 10% lime, 0.25% sodium sulfide, 0.25% sodium sulfhydrate, and 400% water.

As previously stated, the desired results were not obtained with the individual components of the synergistic mixture of this invention. For example, when water alone was used, 10% on the weight of the hide, the hide had a bad odor in less than two days and its condition was so bad that the test was terminated at the end of five days. By then the hide was covered with mold and had a bacterial count of over 2 billion per gram of hide as compared to a count of 30 million bacteria per gram of hide on the initial hide sample. Similar results were obtained when a nonionic liquid surfactant of the polyethylene glycol ether of linear alcohol class known as Tergitol 15-S-9 was used in combination with water; 10% water and 0.3% surfactant, both amounts based on the weight of the hide. After five days' storage, the bacterial count was over 3 billion per gram of hide. Addition of acetic or propionic acid to the water and surfactant (10% water, 0.3% surfactant and 1% acid, all based on the weight of the hide) did not produce any better results even though one might expect the lower pH to have some influence in preventing deterioration. After five days' storage at room temperature, the hide was completely infected with mold and the odor and physical condition was quite objectionable. Sodium chloride, sodium sulfate and sodium acid sulfate, were tested individually, each at 5% combined with 10% water, all amounts based on the weight of the hide. None of the salts were of any value in protecting the hide from deterioration. The hide samples rapidly became moldy after 5 days' storage at room temperature, the odor and physical condition of the hide was objectionable. In fact, the hide samples disintegrated during the lime test. The uron derivative of this invention, N,N'-bis(methoxy)methyl uron, at a level of 2.0% based on the weight of the hide, was tried with and without the addition of water. The results, both with and without added water, were the same. After 5 days' storage at room temperature, the hide had a bad odor and over 300 million bacteria per gram of hide. In addition, the grain of the hide was damaged.

The practice of this invention is demonstrated in the following examples.

Example 1

A hide sample from a freshly slaughtered animal was treated with a mixture containing 10% water, 0.03% surfactant (Tergitol 15-S-9, previously identified), 0.2% N,N'-bis(methoxy)methyl uron, and 1.0% acetic acid, all amounts based on the weight of the hide. The results after 14 days' storage at room temperature are shown in Table I.

Example 2

A hide sample from a freshly slaughtered animal was treated with a mixture containing 10% water, 0.03% surfactant (Tergitol 15-S-9), 0.2% N,N'-bis(methoxy)methyl uron, and 1.0% propionic acid, all amounts based on the weight of the hide. The results of the 14 days' storage at room temperature are shown in Table I.

Example 3

A hide sample from a freshly slaughtered animal was treated with a mixture the same as that used in Example 1 except the uron derivative was omitted. The results are shown in Table I.

Example 4

A hide sample from a freshly slaughtered animal was treated with a mixture the same as that used in Example 2 except that the uron derivative was omitted. The results are shown in Table I.

Example 5

An uncleaned hide (about 92 lbs.) from a freshly slaughtered animal was treated for about 30 minutes with a mixture containing 50% water, 0.03% surfactant (Tergitol 15-S-9), 0.2% N,N'-bis-(methoxy)methyl uron, and 2.0% sodium acid sulfate, all amounts based on the weight of the hide. The results are shown in Table I.

Example 6

Same as Example 5 except that the uron derivative was omitted. After 3 days' storage at room temperature there was mold growth in the hide and after 7 days, the hide smelled putrid and the grain was heavily damaged. The results are shown in Table I.

The results of the experiments in Examples 1 to 6 adequately show that the synergistic mixture of this invention prevents deterioration over extended periods of storage time in hides from freshly slaughtered animals.

A comparison was made of the properties of leather made from hides treated according to the preservation techniques of this invention and leather made from hides salt cured in the customary standard method used in the industry. The grain layer of the leather made from hides treated by the process of this invention was better in many respects than that of leather made from standard salt cured stock. It had more substance and structural body, extra full feel, and more ability to spring back to original shape when squeezed. Comparative data on the physical properties of the two hides is shown in Table II. The leather made from hide treated by the process of this invention is definitely superior to leather made from hide treated in the conventional way.

In order to show that the amount of water in the synergistic mixture of this invention is not critical, some experiments using different amounts of water in the mixture were run. In one series, four expirements were run. All of the treating mixtures contained 0.2% N,N'-bis(methoxy)methyl uron, 2.0% sodium acid sulfate, and 2.0% sodium chloride. The amount of water used in each experiment was 10%, 20%, 50% and 100%, respectively. Amounts of all components were based on the hide weight. In a second series, four experiments were also run. All of the treating mixtures contained 0.2% N,N'-bis(methoxy)methyl uron, 2.0% sodium acid sulfate, and 0.5% acetic acid. The amount of water used in each experiment was 10%, 20%, 50% and 100%, respectively. Amounts of all components were based on the hide weight. After treatment, the hide samples were stored at room temperature for 14 days. There were no significant differences in the treated hide samples except for the amount of bacteria on the hide. In the first series the bacteria per gram of hide for the samples treated with the mixtures containing 10, 20, 50 and 100% water were 130, 80, 3.4, and 0.9, respectively. The odor and physical condition of the hides were equally good, they all passed the lime test, and none contained mold growth. In the second series the bacteria count per gram of hide was zero for all samples except the one treated with the mixture containing 100% water and that one contained only 20 bacteria per gram of hide. The odor and physical condition of the hides were equally good, they all passed the lime test and none contained mold growth.

These last experiments demonstrate that a ten-fold dilution in the amount of water does not significantly affect the excellent results obtained in preventing deterioration of hides from freshly slaughtered animals with the synergistic mixture of this invention.

TABLE I

| Ex. | Storage time, days | Odor | Physical condition | Lime test | Bacteria/gram hide |
|---|---|---|---|---|---|
| 1 | 14 | Good | Good | Passed | 1,300. |
| 2 | 14 | do | do | do | 4,400. |
| 3 | 5 | Bad | Bad | Failed | Spoiled by molds. |
| 4 | 5 | do | Bad | do | Do. |
| 5 | 8 | Good | Good | Passed | 600,000. |
| 6 | 3 | Bad | Bad | Failed | Spoiled by molds. |

TABLE II

A. Tensile strength, pounds per square inch

| | Thickness (in.) | Elongation (percent) | Load (lbs.) | Tensile |
|---|---|---|---|---|
| Hide treatment: | | | | |
| This invention | .049 | 40 | 57 | 2,310 |
| Standard salt | .049 | 53 | 54 | 2,190 |

B. Slit tear test

| | Parallel | | Perpendicular | |
|---|---|---|---|---|
| | Thickness (in.) | Load (lbs.) | Thickness (in.) | Load (lbs.) |
| Hide treatment: | | | | |
| This invention | .050 | 11.6 | .051 | 15.6 |
| Standard salt | .045 | 12.0 | .047 | 14.7 |

C. Mullen grain crack

| | Thickness (in.) | Extension (percent) | Load (lbs.) |
|---|---|---|---|
| Hide treatment: | | | |
| This invention | .048 | 76 | 355 |
| Standard salt | .049 | 63 | 290 |

D. Satra grain crack

| | Thickness (cm.) | Extension (mm.) | Load (kg.) |
|---|---|---|---|
| Hide treatment: | | | |
| This invention | .124 | 9.57 | 26 |
| Standard salt | .124 | 9.24 | 23 |

We claim:

1. A method of preventing hides from freshly slaughtered animals from deteriorating comprising treating said hides for at least fifteen minutes with a synergistic mixture of water, surfactant, a short carbon chain alkanoic acid and N,N'-bis(methoxy)methyl uron.

2. The method of Claim 1 wherein the components of the synergistic mixture are present in the following amounts based on the weight of the hide: from about 10% to 100% water, about 1.0% short carbon chain alkanoic acid, and about 0.2% N,N'-bis(methoxy)methyl uron.

3. The method of Claim 2 wherein the short carbon chain alkanoic acid is acetic acid.

4. The method of Claim 2 wherein the short carbon chain alkanoic acid is propionic acid.

5. A method of preventing hides from freshly slaughtered animals from deteriorating comprising treating said hides for at least fifteen minutes with a synergistic mixture containing from about 10% to 100% water, about 1.0 to 2.0% of an acidic component selected from the group consisting of acetic acid, propionic acid and sodium acid sulfate, about 0.03% nonionic surfactant, and about 0.2% N,N'-bis(methoxy) methyl uron, all amounts based on the weight of the hide.

6. The method of Claim 5 wherein the acidic component is sodium acid sulfate.

7. The method of Claim 5 wherein the acidic component is acetic acid.

8. The method of Claim 5 wherein the acidic component is propionic acid.

9. The method of Claim 5 wherein the nonionic surfactant is a polyethylene glycol ether of a linear alcohol.

References Cited

UNITED STATES PATENTS 3,294,478    12/1966    Sittenfeld    8—94.33

DONALD LEVY, Primary Examiner

U.S. Cl. X.R.

8—94.33